(12) United States Patent
Mitra

(10) Patent No.: US 9,916,938 B2
(45) Date of Patent: Mar. 13, 2018

(54) POROUS CARBON ELECTRODES FOR ENERGY STORAGE APPLICATIONS

(71) Applicant: Farad Power, Inc., Hillsborough, CA (US)

(72) Inventor: Shantanu Mitra, Hillsborough, CA (US)

(73) Assignee: Farad Power, Inc., Sunnyvale, CA (US)

(*) Notice: Subject to any disclaimer, the term of this patent is extended or adjusted under 35 U.S.C. 154(b) by 18 days.

(21) Appl. No.: 15/208,336

(22) Filed: Jul. 12, 2016

(65) Prior Publication Data

US 2017/0323738 A1    Nov. 9, 2017

Related U.S. Application Data

(63) Continuation of application No. PCT/US2014/061188, filed on Oct. 17, 2014.

(30) Foreign Application Priority Data

May 3, 2016    (IN) .............................. 201617015427

(51) Int. Cl.
| | | |
|---|---|---|
| *H01G 11/86* | (2013.01) | |
| *C01B 31/08* | (2006.01) | |
| *H01G 11/24* | (2013.01) | |
| *H01G 11/34* | (2013.01) | |
| *H01G 11/36* | (2013.01) | |
| *H01G 11/42* | (2013.01) | |

(52) U.S. Cl.
CPC .......... *H01G 11/86* (2013.01); *C01B 31/086* (2013.01); *H01G 11/24* (2013.01); *H01G 11/34* (2013.01); *H01G 11/36* (2013.01); *H01G 11/42* (2013.01)

(58) Field of Classification Search
None
See application file for complete search history.

(56) References Cited

U.S. PATENT DOCUMENTS

| 7,803,345 B2 | 9/2010 | Leis et al. |
| 8,454,918 B2 | 6/2013 | Wang et al. |

(Continued)

FOREIGN PATENT DOCUMENTS

WO    WO 2015058113 A1 *    4/2015    ............. C01B 31/02

OTHER PUBLICATIONS

Kendrick, T.C. et al., in The Chemistry of Organosilicon Compounds, Patai, S. and Rappaport, Z., (eds.), 1989, Wiley, New York, pp. 1289-1362.

(Continued)

*Primary Examiner* — Shamim Ahmed
*Assistant Examiner* — Bradford M Gates
(74) *Attorney, Agent, or Firm* — Geeta Kadambi; Riddhi IP LLC

(57) ABSTRACT

The present patent application discloses a method of producing nano-porous carbon, comprising mixing furfuryl alcohol or its fast-polymerizing derivatives with an aluminum-based solid polymerization catalyst, heating the mixture until a solid catalyst-carbon matrix forms, heating again under inert atmosphere and etching the powder to remove the matrix to produce a network of pores in the nano-porous carbon. The application further provides a method for making of fabricating tailor-made nano-porous carbon electrodes.

14 Claims, 17 Drawing Sheets

1

2

(56) References Cited

U.S. PATENT DOCUMENTS

| | | |
|---|---|---|
| 2009/0170000 A1 | 7/2009 | Coowar |
| 2010/0035093 A1 | 2/2010 | Ruoff et al. |
| 2012/0134071 A1 | 5/2012 | Sadoway et al. |
| 2012/0148473 A1 | 6/2012 | Kramarenko |
| 2015/0030525 A1* | 1/2015 | Mitra .................. C01B 31/08 423/445 R |

OTHER PUBLICATIONS

Pandolfo, A. G. et al., J. Power Sources, 2006, 157 1-27.

Gamby, J. et al., Studies and characterisations of various activated carbons used for carbon/carbon supercapacitors, J. Power Sources, 2001, 101(1) 109-116.

Andrew Burke, Ultracapacitors: Why, How, and Where is the technology, J. Power Sources, 2000, 91:37-50.

John B Goodenough, Basic Research Needs for Electrical Energy Storage, Report of the Basic Energy Sciences Workshop on Electrical Energy Storage, Office of Basic Energy Sciences, DOE, Jul. 2007.

Conway, B. E. et al., Electrochemical Supercapacitors: Scientific Fundamentals and Technological Applications, 1999, Kluwer Academic/Plenum, New York.

Kotz, R. and Carlen M., Priniciples and Applciaitons of Electrochemical Capacitors, Electrochimica Acta, 2000, 45:2483-2498.

DeLaRue, R. E and Tobias, C. W., On teh conductivity of dispersions, J. Electrochem. Soc., 1959, 106:827).

Barbieri, O. et al., Capacitance Limits of High Surface Area Activated Carbons for Double Layer Capacitors. Carbon, 2005, 43:1303.

González, R. et al., Polymerization of furfuryl alcohol with trifluoroacetic acid: the influence of experimental conditions, Makromol. Chem., 1992, 193:1-9.

Vinod, M. P. et al., A novel Luminescent functionalized Siloxane Polymer, J. Phys. Chem. B, 2003, 107 (42):11583-11588.

Suresh, S. et al., Formation of Silicon nanoclusters during the reaction of B-Ionone with Tertrachlorosilane, Chem. Mater.,1997, 9:1186-1190.

Vinod, M. P. et al., Silicon based light emitting gel, Appl. Phys. Lett., 1996, 68:81-83.

Myers, A. G. et al., Silicon directed Aldol reaction. rate acceleration by small rings, J. Am. Chem. Soc.,1992, 114:7922-7923.

* cited by examiner

A            B

A

B

C

A

B

C

D

A

B

A

B

C

D

E

Y Axis = Incremental pore volume (cm³/g)

POROUS CARBON ELECTRODES FOR ENERGY STORAGE APPLICATIONS

CROSS-REFERENCE TO RELATED APPLICATIONS

This application claims the benefit of Indian Patent Application 201617015427 filed on May 3, 2016, which claims priority to US PCT Application PCT/US2014/061188 filed on Oct. 17, 2014, the contents of which are incorporated in their entirety.

BACKGROUND OF THE INVENTION

Electrical double layer capacitors (EDLCs), also called supercapacitors or ultracapacitors, have received a lot of interest lately due to their potential for providing high power densities. However, they have fallen short in energy-density capabilities, which has curtailed their widespread application as an alternative, more powerful energy source to conventional batteries. Commercially available supercapacitors today are constructed from activated carbon electrodes made primarily from coconut-shell charcoal powder and have surface areas of 2000 $m^2/g$ and energy densities of ~6 Wh/Kg (Pandolfo, A. G. et al., *J. Power Sources*, 2006, 157:11-27; Conway, B. E. et al., *Electrochemical Supercapacitors: Scientific Fundamentals and Technological Applications*, 1999, Kluwer Academic/Plenum, New York; Gamby, J. et al., *J. Power Sources*, 2001, 101(1):109-116; Burke, A., *J. Power Sources*, 2000, 91:37-50; "Basic Research Needs for Electrical Energy Storage", Report of the Basic Energy Sciences Workshop on Electrical Energy Storage, Office of Basic Energy Sciences, DOE, July 2007). Capacitance in these devices is determined by the surface area, pore size and its distribution, nature and concentration of the surface functional groups of the carbon material used to construct the electrodes, and the electrolytes (aqueous, organic or ionic solvents).

EDLC electrodes are typically constructed by mixing coconut-shell carbon powder with various binders and additives (up to 15%) to improve the mechanical and electrical properties, and then rolling and compacting the powder into sheets. Multiple sheets (with a separator to electrically isolate adjacent sheets) are then packaged, cut to size and filled with electrolyte to form the supercapacitor (example in FIG. 1). Different electrolytes like aqueous solutions (e.g. $H_2SO_4$, KOH), organic solutions (acetonitrile, propylene carbonate) or ionic liquids can be used to provide different energy density and voltage characteristics, although only organic-solvents-based devices have achieved any commercial success so far.

The key features that enable higher specific-capacitance from electrodes are the surface chemistry and the nature of the porosity of the electrodes. Several attempts are underway to fabricate electrodes using novel processing techniques that include the use of "Hard" and "Soft" templates. "Hard templating" is defined as a process in which the template and the carbon sources are made separately. The interconnecting pore structure of the template is made before the templating process. The pores are then filled with the carbon source and the template is removed after the formation of the carbon matrix. "Soft templating" is defined as a process in which the template and the carbon source are synthesized as a composite material and the template is formed as an embedded network of non-carbon material within the carbon matrix. The soft template is then removed to make the porous carbon.

Current industry efforts to make novel EDLC electrodes fall into the following three categories:
1) "Hard" templates into which the electrode materials are deposited; examples include the use of long-chain organic surfactant templates described by Nanotecture (U.S. Published Application No. 2009/0170000; Coowar) and Si-oxide templates disclosed by Nanotune (U.S. Pat. No. 8,454,918; Wang et al.);
2) "Soft" templates of non-carbon elements embedded within a carbon matrix: examples include techniques disclosed by Skelton Technologies (U.S. Pat. No. 7,803,345; Leis et al.) and YCarbon (U.S. Published Application No. 2012/0148473; Kramarenko);
3) Techniques to grow electrode surfaces (primarily in monolithic form) using exotic materials like graphene, carbon nano tubes (CNT), etc.; examples include U.S. Published Application No. 2010/0035093 (Ruoff et al.) and U.S. Published Application No. 2012/0134071 (Sadoway et al.).

SUMMARY OF THE INVENTION

In one aspect, this invention provides a method of producing nano-porous carbon, comprising: a) mixing furfuryl alcohol or its fast-polymerizing derivatives with an aluminum-based solid polymerization catalyst; b) heating the mixture until a solid catalyst-carbon matrix forms; c) heating under inert atmosphere; and d) etching the powder to remove the matrix to produce a network of pores in the nano-porous carbon. In one embodiment, the aluminum-based solid polymerization catalyst used in the method is alumina ($Al_2O_3$) or aluminum hydroxide ($Al(OH)_3$). In another embodiment, the method further comprises activating the nano-porous carbon. In a further embodiment, the activating comprises heating under controlled atmosphere. In another embodiment, the first heating step is performed between about 100° C. and about 200° C. In a further embodiment, the second heating step is performed between about 500° C. and about 650° C. In another embodiment, the etching step utilizes NaOH, HCl, HF or $Cl_2$.

In another aspect, the invention provides a method of fabricating tailor-made nano-porous carbon electrodes, comprising: a) diluting a fast polymerizing carbon-containing source with a less reactive liquid carbonyl-containing carbon source; b) mixing in a liquid acidic polymerization catalyst; c) pouring the mixture into a mold; d) allowing the mixture to solidify to form a solid catalyst-carbon matrix; e) unmolding the formed solid catalyst-carbon matrix; f) etching the solid catalyst-carbon matrix to remove the catalyst from the carbon matrix to produce nano-porous carbon; and g) activating the nano-porous carbon. In one embodiment, the fast polymerizing carbon-containing source is furfuryl alcohol or its derivatives. In another embodiment, the less reactive liquid carbonyl-containing carbon source comprises an aldehyde or a ketone that is liquid at room temperature. In a further embodiment, the less reactive liquid carbonyl-containing carbon source is acetone. In yet another embodiment, the liquid acidic polymerization catalyst comprises $SiCl_4$ and its derivatives or $TiCl_4$ and its derivatives. In a further embodiment, the liquid acidic polymerization catalyst is tetrachlorosilane, dichlorosilane, trichlorosilane, dichlorodimethylsilane, titanium tetrachloride, titanium isopropoxide, titanium ethoxide or titanium butoxide. In another embodiment, the rate of formation of the solid catalyst-carbon matrix is controlled by the addition of NaOH during the first step. In a further embodiment, the mixing step is performed at a controlled temperature. In another embodiment, the etching step utilizes NaOH, HCl, HF or $Cl_2$.

Other objects of the invention may be apparent to one skilled in the art upon reading the following specification and claims.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

This application is not limited to particular methodologies or the specific compositions described, as such may, vary. It is also to be understood that the terminology used herein is for the purpose of describing particular embodiments only, and is not intended to be limiting, since the scope of the present application will be limited only by the appended claims and their equivalents.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present application, the preferred methods and materials are now described. All publications mentioned herein are incorporated herein by reference to disclose and describe the methods and/or materials in connection with which the publications are cited.

Disadvantages of Known Production Methods

Several problems associated with pore size and distribution of existing EDLC electrodes drive the search for new electrode manufacturing techniques. For example, higher surface area not always better. Although activated carbon with very high surface area (>3500 $m^2/g$) is commercially viable, electrodes made with these carbons rarely show a linear increase in capacitance with increasing surface area. This is often attributed to the inability of the electrolyte ions to access the small pores, which are the significant contributor to the high surface area of carbon electrode. Another unintended consequence of the smaller and smaller pore sizes is low stability under high voltage operations. As the surface area increases, the number of small pores increases resulting in a decrease in the pore wall thickness, making the EDLC susceptible to failure in the presence of high electric fields. Porosity in the current EDLC electrodes is obtained from the inherent porosity in the coconut-shell carbon these electrodes are made from, and from the activation process of the carbon (via heating at high temperatures under steam or $CO_2$).

Figure 1:
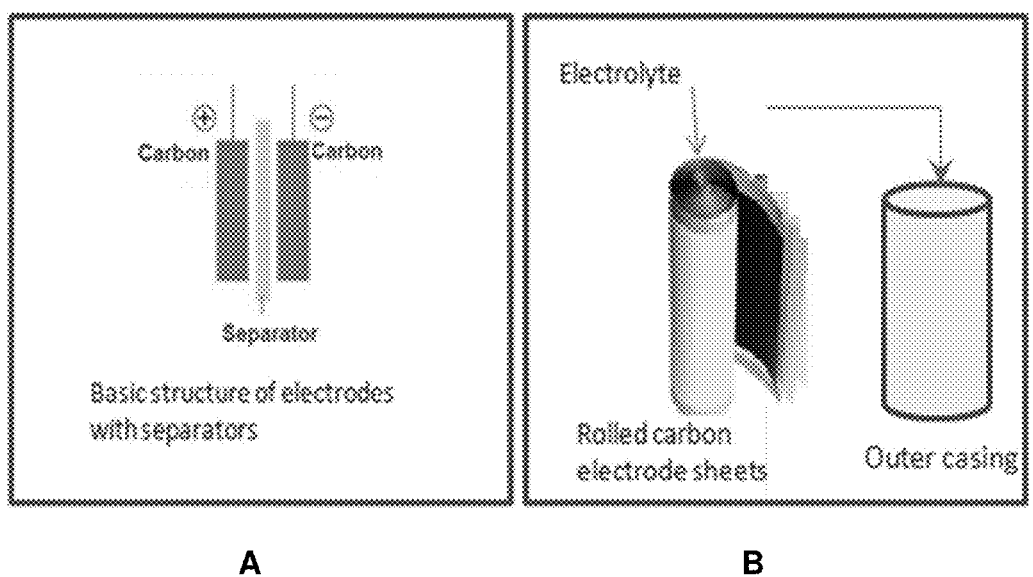
FIG. 1 depicts current supercapacitor construction showing separators (A) and rolled electrode sheets (B).
Figure 2:
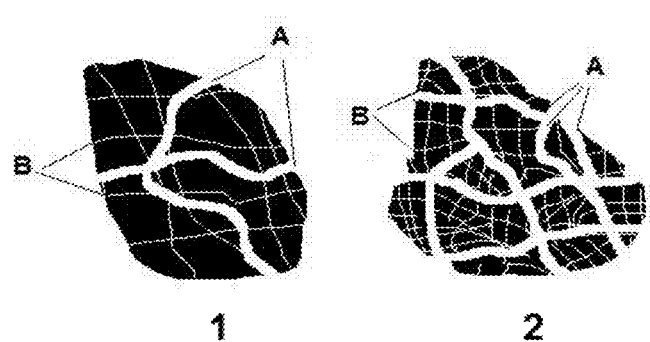
FIG. 2 shows (1) pore distribution in a conventional activated carbon electrode particle showing limited access to the fine pores via the larger transport pores, marked "A"; (2) a more efficient pore distribution obtained through double templating allowing more access to the finer "double-layer-formation" pores, marked "B".

Further, for organic electrolyte-based devices, two types of pores are preferable as shown in FIG. 2. These are: 1) a "micro"-pore distribution of ~2 nm and above, which can support the double-layer formation without overcrowding the ions; 2) and a set of transport pores with diameter 10-20 nm and higher, which acts as a reservoir for the electrolyte during the charge-discharge process.

In addition, the so-called "tortuous pores" (as opposed to "straight" pores) that are typically obtained with the current activation processes used to create porous carbon electrodes today are known to reduce the conductivity of the electrolyte in the device and also to hinder the double-layer formation (Kotz, R. and Carlen M., *Electrochimica Acta*, 2000, 45:2483-2498; and DeLaRue, R. E. and Tobias, C. W., *J. Electrochem. Soc.*, 1959, 106:827). The more desirable configuration is "straight" pores for transport that also allow the use of thicker electrodes (up to 200 µm), without requiring any conductivity enhancers. The use of thicker electrodes also increases the volumetric capacitance resulting in better energy densities of the final device by reducing the amount of aluminum foil (several times as dense as the carbon electrode itself) that is currently used as the current collector in existing configurations.

Further, in one of the final steps in current device manufacturing, the porous electrodes are dried before being filled with the electrolyte. In the case of high surface-area porous carbon with very small pores (typically <2 nm), water removal is a tedious and expensive process. However, since even trace amounts of water in the micro-pores reduces the overall cycle life of the device (by generating a series of Faradic reactions), drying the electrode is a very critical step. Newer porous electrode manufacturing processes thus focus on creating >2 nm pores for the double-layer formation and try to eliminate any <2 nm pores because these cannot support double-layer formation, but at the same time keep tightly held water molecules from being driven out during the drying process. Other studies have shown that pores <1.8 nm do not participate in double-layer formation (Barbieri, O. et al., *Carbon*, 2005, 43:1303).

Description of the Present Method

The templating techniques of the present invention are fundamentally different from the techniques currently used and can address all the points made above with respect to improving the overall performance of supercapacitor devices. Our fundamental process utilizes a polymerization reaction of various carbon sources to form a solid carbon material with either a "hard" (external) template or a "soft" (internal) template, or both. The carbon source is polymerized in the presence of catalysts selected according to the type of polymerization reaction undergone by the carbon source. Besides the hard and soft templates used to form pores, our method is also compatible with the standard activation processes used today to create pores, although they are not required, and if used, need to be controlled to prevent the issues described above.

Production of Nano-Porous Carbon.

The starting materials (carbon sources) utilized in the method of the present invention are liquid and can be classified in to two categories. Class 1 materials undergo very fast polymerization reactions. Class 1 carbon-containing sources comprise the furfuryl moiety compound and its fast-polymerizing derivatives, including, but not limited to, furfuryl alcohol, acetylfuran, furfuraldehyde, 5-hydroxymethylfurfural and 5-methylfurfural. Furfuryl alcohol and some of its derivatives polymerize very quickly in the presence of the some catalysts (mentioned below) (Gonzilez, R. et al., *Makromol. Chem.*, 1992, 193:1-9). This reaction needs to be controlled by either using milder catalysts (e.g. solid alumina, $Al_2O_3$, or aluminum hydroxide, $Al(OH)_3$) or by diluting the furfuryl alcohol with a less reactive liquid carbonyl-containing carbon source, for example, acetone and reducing the reaction temperature if catalysts like silane or $TiCl_4$ (or their derivatives) are used. In the former case (Class 1 sources plus solid alumina or aluminum hydroxide powder), a hard template is formed by the ceramic powder, while in the latter case (Class 1 sources plus silane or $TiCl_4$ catalysts), an internal "soft" template of either Si—O or Ti—O links remain embedded in the solid carbon.

Class 2 carbon sources undergo slow polymerization reactions. These reagents are ketones, aldehydes and some derivatives of furfuryl alcohol, and include 13-Ionone, acetylfuran and similar reagents (Vinod, M. P. et al., *J. Phys. Chem. B*, 2003, 107(42):11583-11588; Suresh, S. et al., *Chem. Mater.*, 1997, 9:1186-1190; Vinod, M. P. et al., *Appl. Phys. Lett.*, 1996, 68:81-83; Myers, A. G. et al., *J. Am. Chem. Soc.*, 1992, 114:7922-7923; Sifter, D., in *Silicon Based Polymer Science*, J. M. Zeigler, J. M. and Fearon, F. W. G. (eds.), 1990, American Chemical Society, Washington D.C., p. 565; Kendrick, T. C. et al., in *The Chemistry of Organosilicon Compounds*, Patai, S. and Rappaport, Z., (eds.), 1989, Wiley, New York, pp. 1289-1362). Class 2 compounds comprise ketones, for example, but not limited to, acetone, α-ionone, β-ionone, benzophenone, and acetylacetone, as well as any ketone that is liquid at room temperature and polymerizable under the method of the disclosure. Class 2 compounds further comprise aldehydes, including, but not limited to, benzaldehyde, acetaldehyde, as well as any aldehyde that is liquid at room temperature and polymerizable under the method of the disclosure. No control is needed for the slow polymerization reaction and catalysts like silane or $TiCl_4$ (or their derivatives) are used. This reaction also results in a "soft" template of either Si—O or Ti—O bonds, depending on the type of catalyst used. The cross-link density can be further increased by adding suitable cross-linking agents.

The polymerization of both Class 1 and Class 2 carbon sources may be catalyzed using strongly acidic catalysts like silane and its derivatives (for example, tetrachlorosilane, dichlorosilane, trichlorosilane, dichlorodimethylsilane, and the like), or titanium tetrachloride ($TiCl_4$) and its derivatives (for example, titanium isopropoxide, titanium ethoxide, titanium butoxide, and the like).

In one embodiment, Class 1 carbon source furfuryl alcohol may be polymerized using alumina powder. Fine particles of alumina or aluminum hydroxide (below 100 nm in size) are mixed into bulk furfuryl alcohol at room temperature. The mixture is continually stirred to ensure wetting of all particles by the furfuryl alcohol. Once a viscous paste is formed, the mixture is then sonicated to ensure even mixing, for example, for up to 30 minutes. The mixture is then heated to temperatures between about 100° C. and about 200° C. for about 1 to about 2 hours under atmosphere to form a black solid. Lower temperatures may be used, although at temperatures below about 100° C., the process may take longer than practical. Temperatures greater than about 200° C. should not be used because undesirable oxidation may occur. No additional catalyst is needed to polymerize the furfuryl alcohol. Next, the solid is heated at temperatures between about 500° C. to about 650° C. for about 1 hour to about 2 hours under nitrogen to remove any unpolymerized material. Etching with a 1M solution of NaOH, or any other etchant know in the art that etches alumina but not carbon, at elevated temperatures of up to about 80° C. remove the external alumina template. This step is followed by activation ($CO_2$ or steam) at temperatures between about 700° C. and about 1100° C.

Construction of Electrodes.

The method of the present invention comprises four novel embodiments to construct porous carbon EDLC electrodes from both Class 1 and Class 2 starting materials. These are: 1) use of a "hard" template using a ceramic powder to produce a nano-porous carbon powder followed by conventional carbon powder processing to form electrodes; 2) use of a "hard" template using a ceramic powder to produce tailor-made electrodes; 3) use of an external monolithic "hard" template to produce monolithic electrodes; and 4) use of a "soft" template internal structure to produce tailor-made electrodes.

I. "Hard" Template Ceramic Powder with Conventional Processing.

This embodiment involves the use of an aluminum-based solid polymerization catalyst, such as alumina or aluminum hydroxide powder, as an external "hard" template and a carbon source (Class 1 or Class 2). In one embodiment, a Class 1 carbon source is mixed with a ceramic powder and polymerized to result in solid carbon (no additional catalyst is used). Different sized ceramic powder particles can be used to create two different distributions of pore-sizes in the final product. In another embodiment, a Class 2 carbon source is used (along with a catalyst), resulting in an additional "soft" template embedded in the solid carbon. Eventual removal of both the templates provides two methods to form pores in the solid carbon—"double templating". The carbon synthesized from this technique is jet-milled into a uniform powder and mixed with binders and additives to construct the final electrodes using existing electrode manufacturing processes.

In the embodiment utilizing Class 1 sources (e.g. furfuryl alcohol), polymerization is effected by direct heating of the mixture, where the alumina/aluminum-hydroxide powder acts as both a catalyst and a template. In the embodiment utilizing Class 2 starting materials, a polymerization catalyst such as silane (or its derivatives) or $TiCl_4$ (or its derivatives) must also be added, as described in U.S. patent application Ser. No. 14/341,725, filed Jul. 25, 2014. Both $Al_2O_3$ and $Al(OH)_3$ powders of different particle sizes (ranging from 5 nm to 100 nm) may be used. Powders with other particle sizes can also be used as the external template, and will affect the size and shape of the pores in the final activated carbon product.

Figure 3:
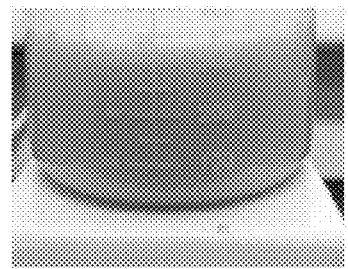
FIG. 3 depicts a mixture of furfuryl alcohol and nano-particles of aluminum oxide, (A) immediately after mixing; (B) after ultrasonic mixing and storage for 7 days; and (C) after heat treatment at 200° C.
Figure 3:
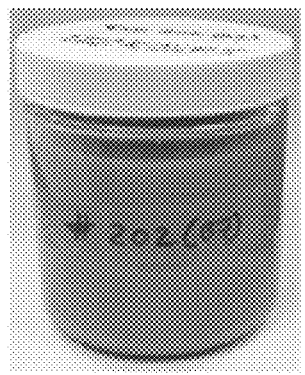
Figure 3:

Furfuryl alcohol/alumina and furfuryl alcohol/$Al(OH)_3$ mixtures may be polymerized by heat treatment in air at temperatures in the 200° C.+/−50° C. range (for 30 minutes to 3 hours), resulting in a black solid (polymerized carbon precursor in an external matrix of $Al_2O_3$ or $Al(OH)_3$ powder). An example of this process is shown below in FIG. 3 for a 5 nm (particle size) alumina powder. Similar results were obtained with alumina and aluminum hydroxide powders with particle sizes from 20 nm to 100 nm.

Figure 4:
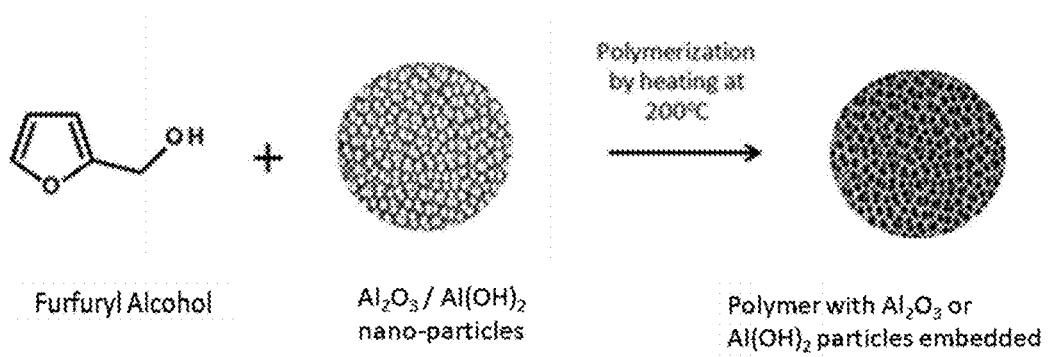
FIG. 4 shows furfuryl alcohol mixed with aluminum oxide nano-particles to yield a polymerized carbon network after treatment at 200° C. The aluminum oxide is then removed by etching (step 3), leaving a porous carbon structure.

The polymerization reaction is depicted in FIG. 4. Once polymerized, the material is subjected to a high temperature heat treatment in the range of about 400° C. to about 700° C. under an inert atmosphere, for example, 600° C. under nitrogen. This results in a carbon/alumina (or $Al(OH)_3$) structure. This is followed by pulverizing the solid into a powder of ~1 mm particle size and etching to remove the non-carbon material (alumina or $Al(OH)_3$), leaving behind a porous carbon structure (pores in the nanometer range depending on size of the starting powder). The carbon is then activated using $CO_2$, steam or similar processes and jet-milled into a fine powder (particle size in 1-5 micron range). The powder is then processed via existing powder-processing techniques (with binders and additives) to make EDLC electrodes. In a further embodiment, $Al_2O_3$/$Al(OH)_3$ powders of different sizes can be used resulting in two or more pore-size distributions in the final powder. The basic method to create porous carbon powder from a Class 1 carbon source and a hard template is shown in FIG. 5 and described in Example 4.

Figure 5:
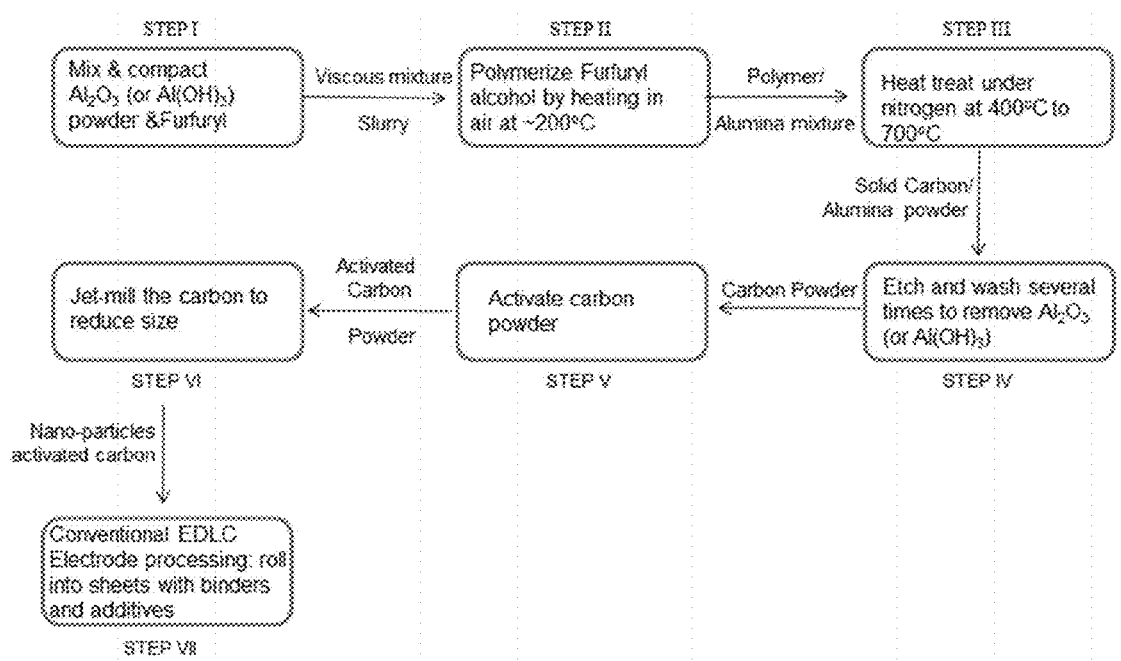
FIG. 5 depicts methodology to create carbon powder using an external template of alumina/$Al(OH)_3$ powders, that are then further processed by conventional powder processing

For the embodiment where Class 2 carbon sources like acetylfuran and β-Ionone are used, the basic methodology is similar to that shown in FIG. 5 and described in Example 5. The only differences are within Steps I and II, where the catalyst is added to the carbon source and mixed thoroughly before adding the alumina/aluminum-hydroxide powder (Step I) and the polymerization is carried out at room or slightly elevated temperatures (e.g. 40° C. to 120° C.).

II. "Hard" Template Ceramic Powder for Tailor-Made Electrodes.

In this embodiment, electrodes, in different shapes, are made from a powder template and a carbon source by using techniques that are different from conventional powder processing. The powder template and the carbon sources (Class 1 and Class 2/with additional catalysts) form a slurry that is coated on an electrode substrate or applied to molds of different shapes, followed by various heat-treatments and etching processes as described below. In the embodiment utilizing Class 2 carbon sources, an additional soft template also forms after solidification, resulting in a second method to create pores in the solid carbon (double templating). This process leads to binder-less electrodes with potentially higher capacitance and lower ESR (Equivalent Series Resistance) than conventional electrode manufacturing processes that use more than 10% binders and other additives. Furthermore, the electrodes of the present invention are configured to be used in an elegant manufacturing process which does not require the current elaborate techniques involving winding the electrodes on to current collectors and then further winding them with the separators.

Figure 7:
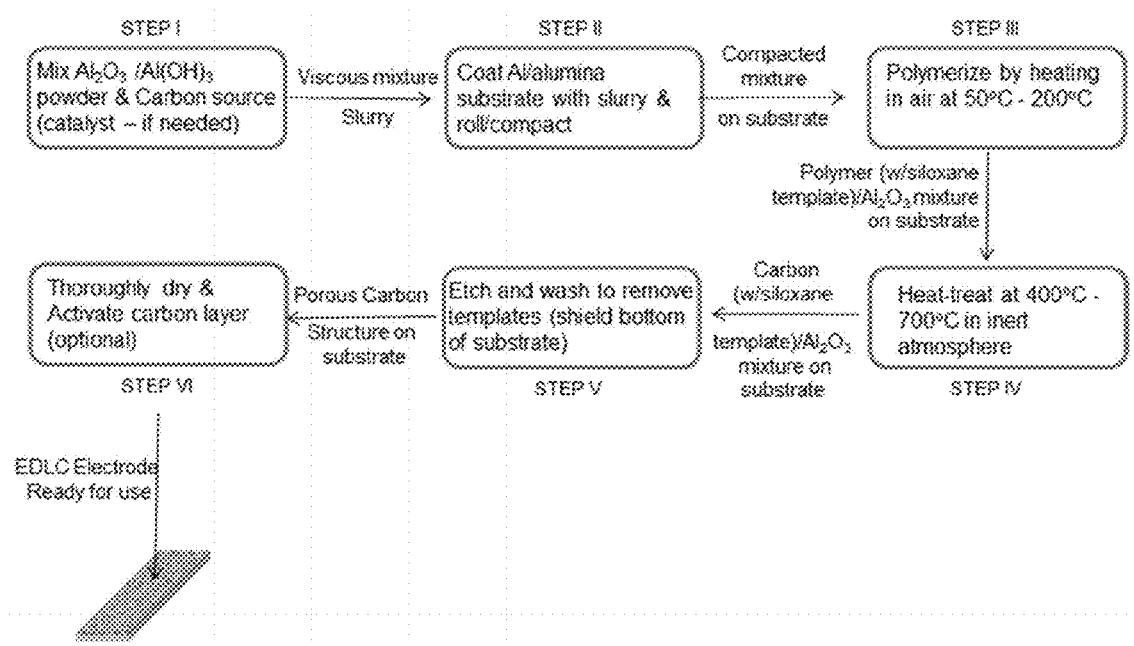
FIG. 7 depicts methodology to create porous carbon electrodes with an alumina backing using an external template.

This embodiment uses an external, "hard" template of alumina or $Al(OH)_3$ powder of different sizes and carbon sources such as furfuryl alcohol (or ketones, aldehydes, or furfuryl alcohol derivatives that polymerize in the present of catalysts like silane or $TiCl_4$, or their derivatives). The carbon source (with or without polymerization catalyst)/nano-powder mixture is applied to a mold or substrate after mixing. All further processing is performed with this electrode pre-form, resulting in an activated carbon electrode in final form without creating an activated carbon powder that needs to be powder-processed with binders and fillers, resulting in a binder-less electrode. The basic steps in the method that produces sheets with a backing of alumina are shown in FIG. 7 and described in Example 6.

Figure 8:
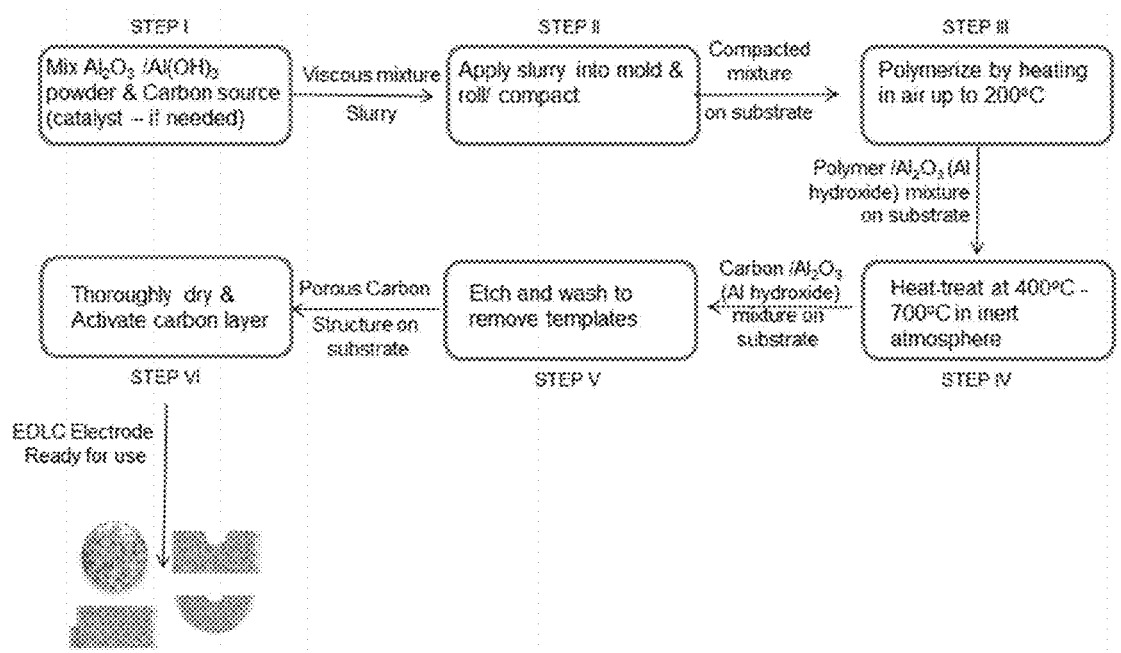
FIG. 8 depicts methodology to create porous carbon electrodes in different shapes using an external template of alumina/$Al(OH)_3$ powders.

In a further embodiment, the method to create EDLC electrodes in different shapes involves the use of a mold of non-reactive and pliable material such as Teflon. The main steps in this process are shown in FIG. 8 and described in Example 6. In this process, the slurry is loaded into the mold (with a Teflon backing) and rolled/compacted. The Teflon material compresses during the rolling step and also allows compaction of the slurry, ensuring good contact between the nano-powder particles. Depending on the type of mold used, the final electrode can be in sheet form or in the form of different shapes like rounds, semicircles, squares or rectangular of different sizes. See FIGS. 9 and 10 and Example 9.

III. "Hard" External Monolithic for Monolithic Electrodes.

With this method, monolithic electrodes are made from a monolithic template and a Class 1 carbon source (without any other catalysts). Here, the only source of pores is that of the hard ceramic template, which is removed to leave behind pores. These monolithic electrodes lead to devices with no passive components like binders and separators, and have potentially higher capacitance and lower ESR than the conventional electrode manufacturing processes that use more than 10% binders. These electrodes are not compatible with the conventional device manufacturing techniques and new manufacturing processes are needed to make the devices from these electrodes.

Figure 11:
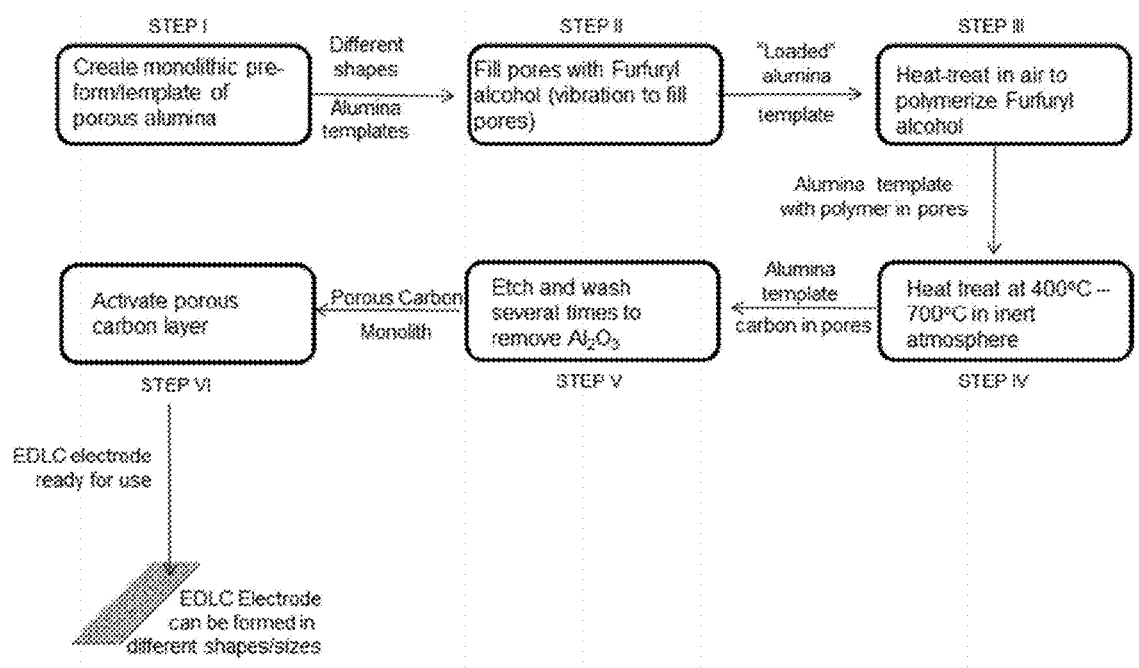
FIG. 11 depicts methodology to fabricate monolithic porous carbon electrodes from monolithic alumina templates as starting material.

This method involves the use of porous monolithic preforms of alumina to form the EDLC electrodes. Aluminum metal in different shapes (in the final electrode form) is electrochemically etched to oxidize it to porous alumina. Final electrode thicknesses are in the 100-200 μm range. The basic steps in the method are shown in FIG. 11 and described in Example 7.

IV. "Soft" Template for Tailor-Made Electrodes.

This embodiment utilizes both Class 1 and Class 2 starting materials (both with the same strong catalysts described below). The carbon source plus the appropriate catalyst are applied to molds of different shapes and sizes. Because no external ceramic powder is used, only the soft templating process is available for pore formation. However, since the Class 1 materials are diluted with slower polymerizing sources like acetone, some un-polymerized acetone in the final product also leaves behind pores after evaporation. This evaporation provides an additional method of pore formation. Following solidification and removal of the soft template (and in some cases the extra un-polymerized acetone), binder-less electrodes with a porous carbon structure are obtained.

This process utilizes an internal "soft" template of siloxane or Ti—O molecules in a carbon composite synthesized as described in a previous patent application (U.S. patent application Ser. No. 14/341,725, filed Jul. 25, 2014). The carbon source is polymerized in the presence of catalysts, leading to leading to the siloxane (or Ti—O)/polymers. As described above, the starting materials can be classified in to two different categories. Class 1 materials undergo a slow polymerization reaction so that no additional control of the rate of reaction is needed in the presence of catalysts (e.g. silane or Ti—O and their derivatives). The cross-link density can be further increased by adding suitable cross-linking agents. Class 2 materials undergo very fast polymerization reactions. For example, furfural alcohol and some of its derivatives polymerize very quickly in the presence catalysts (silane, etc). This reaction is controlled by dilution with acetone and or reducing the reaction temperature.

Figure 12:
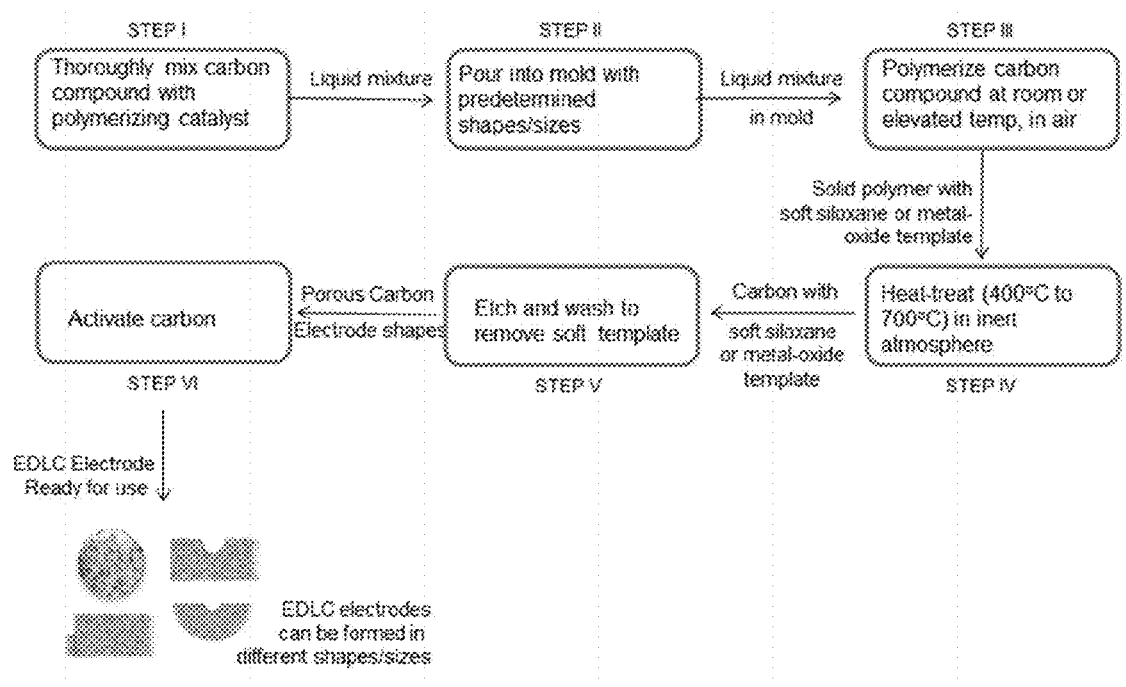
FIG. 12 depicts methodology to fabricate monolithic porous carbon electrodes by polymerizing ketones/aldehydes or acetylfuran in molds with final electrode shapes.
Figure 13:
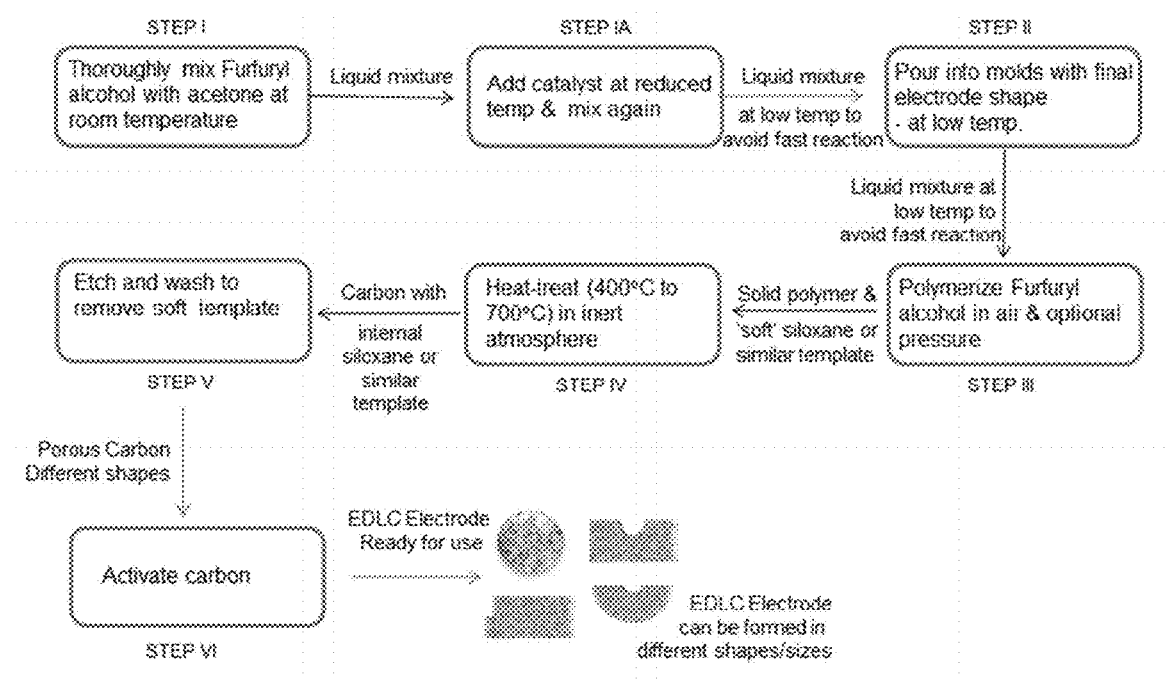
FIG. 13 depicts methodology to fabricate monolithic porous carbon electrodes by polymerizing furfuryl alcohol in molds with final electrode shapes.

For purposes of electrode formation, the methods used here are slightly different for Class 1 and Class 2 starting materials. The basic steps for the embodiment utilizing the slower polymerizing compounds (Class 1) are shown in FIG. 12. The basic steps for the embodiment utilizing furfuryl alcohol (Class 2), a much faster polymerizing compound, are shown in FIG. 13. Example 8 describes details for both embodiments.

EXAMPLES

Example 1: Polymerization of Furfuryl Alcohol Using Alumina

Figure 14:
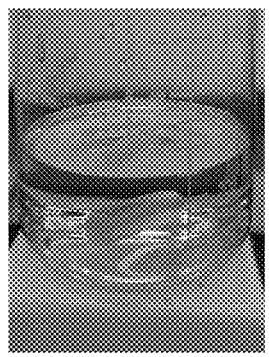
FIG. 14 depicts the experiment described in Example 1: A. Furfuryl alcohol; B. Furfuryl alcohol stirred with some of the alumina powder; C. Furfuryl alcohol plus all of the alumina powder; D. Furfuryl alcohol plus alumina powder, after storage at room temperature for two days; and E. Nano-porous carbon after etching and before activation.
Figure 14:
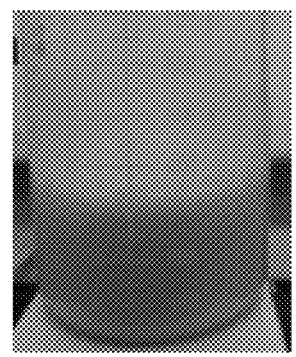
Figure 14:
Figure 14:
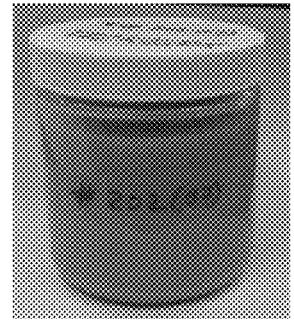
Figure 14:

Formation of Porous Carbon Matrix. Three sizes of alumina or $Al(OH)_3$ particles were used as catalyst templates for the polymerization of furfuryl alcohol. The amounts of alumina and furfuryl are given in Table I. In a one-liter beaker, the furfuryl alcohol (Sigma-Aldrich, St. Louis, Mo.) (See FIG. 14, A) was stirred using a magnetic stirrer while the $Al(OH)_3$ powder was added slowly (FIG. 14, B). The stirring continued until the mixture was thick and no more powder could be added (FIG. 14, C). The mixture was then subjected to ultrasonic vibration to increase mixing, by lowering the beaker into a water bath and then ultrasonically vibrating for up to 30 minutes. The mixture was transferred to a 500-mL (16 oz.) glass jar. The mouth of the jar was covered with Teflon tape before the jar cap was screwed on. The mixture was allowed to stand at room temperature for about two days as the polymerization process started as signified by a change in color (FIG. 14, D).

The mixture was then heated at 200° C. in an oven at atmospheric pressure for 1 hr. A hard, polymerized carbon matrix with an embedded $Al(OH)_3$ particle matrix was formed. This carbon matrix was heated at 600° C. in an oven under nitrogen for 1 hr. The carbon matrix was etched several times in 1 M NaOH solution at 80° C. to remove the aluminum and then washed with deionized water (FIG. 14, E).

TABLE 1

| Sample # | Furfuryl alcohol (mL) | Alumina or $Al(OH)_3$ | |
|---|---|---|---|
| | | grams | Size (nm) |
| 201 | 375 | 64 | 5 (alumina) |
| 202 | 350 | 100 | 20 (alumina) |
| 203 | 250 | 100 | 30-100 (aluminum hydroxide) |

Analysis of Pore Size of Carbon Matrix.

Figure 15:
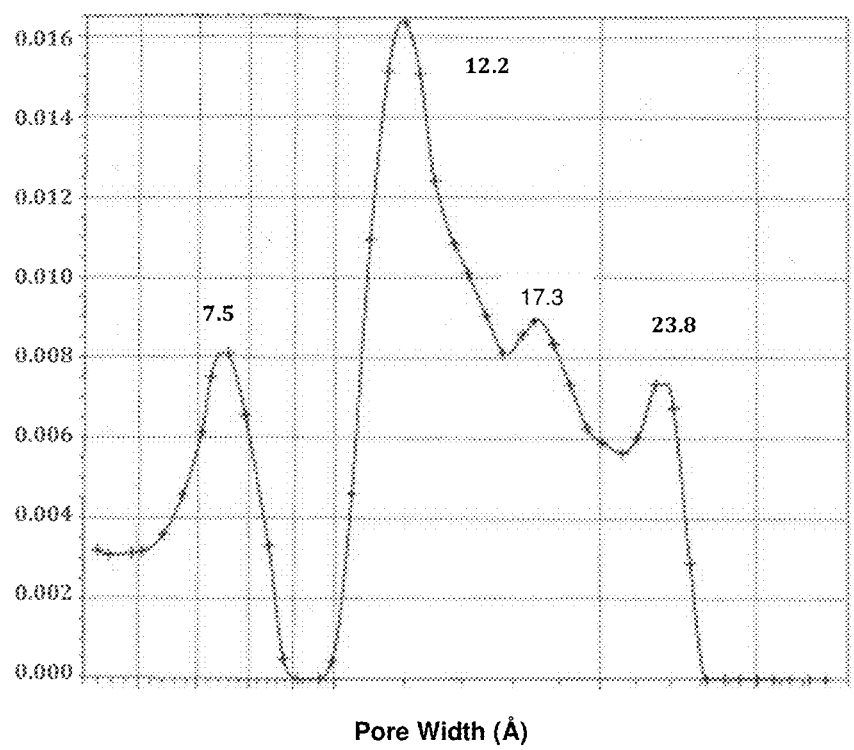
FIG. 15 is a graph of porosity measurements determined on Sample #202 showing pores with sizes around 7.5, 12.2, 17.3 and 23.8 Å.

Sample 202, prepared using 20 nm-sized alumina particles, was activated at 1000° C. under $CO_2$ for 1 hr. Prior to activation, the material was etched to remove the alumina template. The material was sent to an external commercial laboratory for nano-porosity measurements (Particle Technology Labs, Downers Grove, Ill.) using the B.E.T. method on a Tristar II machine. The test conditions used were: 1) analysis gas: argon; 2) bath temperature: 87° K; 3) equilibration time: 30-40 seconds; and 4) sample mass: between 100 and 200 mg. The results are plotted in FIG. 15.

Figure 16:
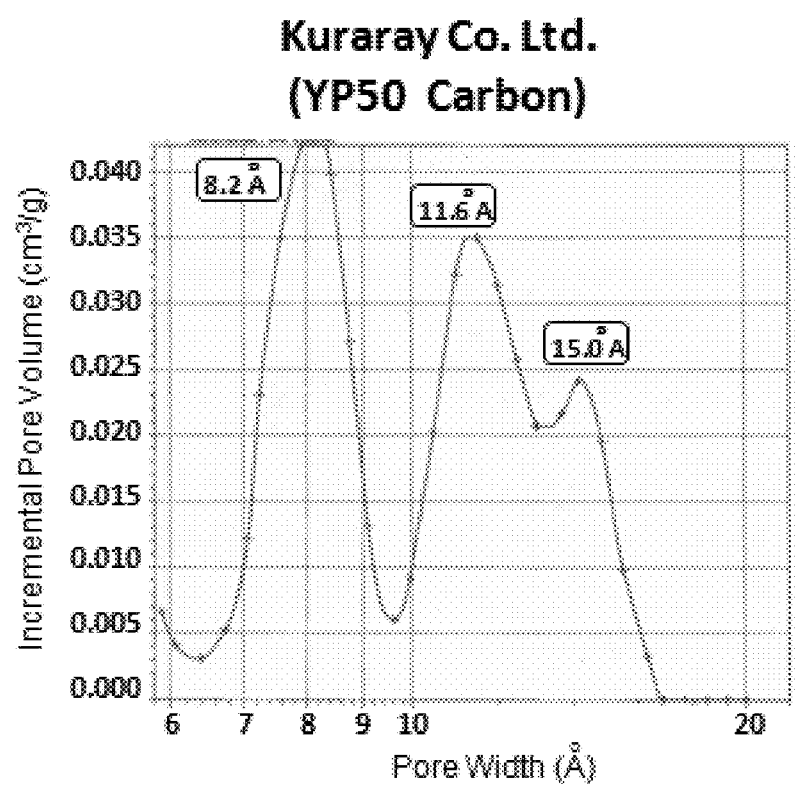
FIG. 16 is a graph of porosity measurements determined on a sample of commercial carbon YP50 (Kuraray Chemical Co., Ltd.) showing pores with sizes around 8.2, 11.6, and 15 Å.

For comparison purposes, a sample of YP50, obtained from Kuraray Chemical Co., Ltd. (Osaka, Japan), was sent for analysis at Particle Technology Labs for the same analysis. YP50 is currently the industry standard nanoporous carbon used for supercapacitor electrode materials. Similar testing parameters were used and the results of these porosity measurements are plotted in FIG. 16. Table 2 compares the pore sizes as measured using the technique described above.

TABLE 2

| Sample | Pore size (Å) | Pore size (Å) | Pore size (Å) | Pore size (Å) |
|---|---|---|---|---|
| #YP50: Commercial | 8.2 | 11.6 | 15.0 | — |
| #202: furfuryl alcohol/alumina | 7.5 | 12.2 | 17.3 | 23.8 |

Example 2: Polymerization of 2-Acetylfuran Using Dichlorodimethylsilane

In a one-liter beaker, 100 g of 2-acetylfuran (Sigma-Aldrich) was stirred for a few minutes using a magnetic stirrer. Catalyst dichlorodimethylsilane, $Si(CH_3)_2Cl_2$ (25 mL) (Sigma-Aldrich), was added slowly. Stirring was continued for 5 minutes and the stir bar was then removed. The mixture was transferred to a 500-mL (16 oz.) glass jar. The mouth of the jar was covered with Teflon tape before the jar cap was screwed on. The jar was allowed to stand at room temperature for 190 hours. A black solid formed.

Example 3: Polymerization of Furfuryl Alcohol Using Dichlorodimethylsilane

In a one-liter beaker, 150 mL of furfuryl alcohol (Sigma-Aldrich) along with 125 mL acetone (high purity, HPLC grade) was stirred for a few minutes using a magnetic stirrer. NaOH pellets (0.1 g) were then added to the mixture and dry ice was packed around the beaker to cool it down. Catalyst dichlorodimethylsilane, $Si(CH_3)_2Cl_2$ (30 mL) (Sigma-Aldrich), was added slowly. Stirring was continued. A black solid formed.

The polymerized material was then heated to 600° C. over a period of one hour in a vacuum tube furnace (Model #GSL-1100, MTI Corporation, Richmond, Calif., US), for under a controlled nitrogen atmosphere. The furnace was maintained at 600° C. for one hour, then allowed to cool naturally to room temperature. The polymerized materials were loaded into quartz boats that were then placed in the center of the quartz tube. Gas lines were attached to one side of the tube using the vacuum fittings provided with the furnace. The other side was left open to atmosphere, via a plastic tube immersed in a beaker of water.

The siloxane/polymer complex was then treated with a 1M aqueous solution of NaOH to remove the siloxane template. Etching was carried out on a hotplate at 60° C. and was followed by washing thoroughly with distilled water at the same temperature to remove the reagents.

Following the etching process, the resulting nano-porous carbon structure was air dried between room temperature to 150° C. This material was activated by heat-treating in a controlled atmosphere furnace in two stages. First, the carbon was heated to 1000° C. under nitrogen in the same furnace described above. Then, the activation process was completed by exposing the carbon to $CO_2$ for one hour, then cooling the activated carbon under nitrogen.

Example 4: "Hard" Template Production of Carbon Powder from Class 1 Sources

Thorough mixing of the carbon source (e.g., furfuryl alcohol) with $Al_2O_3$ or $Al(OH)_2$ powder is critical in determining the uniformity of the nano-porous carbon material produced. The particle size of the ceramic hard template is critical in determining the eventual size of the pores in the carbon. Powder particle sizes <10 nm are ideal, and it is also possible to mix powders of different sizes to create a combination of pore sizes. This is important in providing some larger pore for electrolyte transport in the final device, combined with smaller pores for double-layer formation. The ratio of larger to smaller particle-sizes can be optimized by trial and error based on the rest of the process flow described here. Any excess furfuryl alcohol needs to be removed to ensure uniform porosity in the final carbon (excess furfuryl alcohol will polymerize and form an inert layer of carbon preventing access of the etchants to the ceramic, and thus preventing the formation of the pores). Mixing and compacting of the furfuryl alcohol/nano-particle mixture, without any excess furfuryl alcohol, thus ensures that the nano-particles form a continuous embedded network after solidification. Mixing can be accomplished in a number of different ways, including:

1) Ultrasonic agitation: As described above in Example 1, after mechanically mixing the slurry, the slurry was ultrasonically agitated. The mixture was allowed to stand overnight and then ultrasonically agitated again. This process was repeated several times.

2) Centrifuging the mixture: We have centrifuged the mixture at room temperature at rpm's up to 20,000 after ultrasonically agitating the mixture several times, to obtain a very viscous mass that is ready for polymerization. While centrifuging, per se, is not required, some other form of thorough mixing is required to ensure that the nano-particles are compacted.

Figure 6:
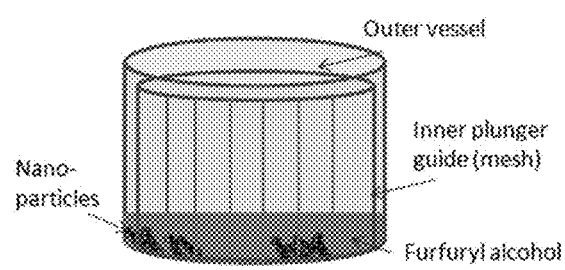
FIG. 6 shows a possible arrangement to squeeze out excess liquid from a furfuryl alcohol/nano-particle mixture, prior to polymerization to ensure a continuous network of alumina/aluminum hydroxide particles after solidification. A) Step 1: ultrasonically agitated to ensure good mixing; B) Step 2: plunger applies pressure and excess liquid flows out at edges; C) Step 3: excess liquid is poured out; D) Step 4: plunger removed, mixture extracted and heated.
Figure 6:
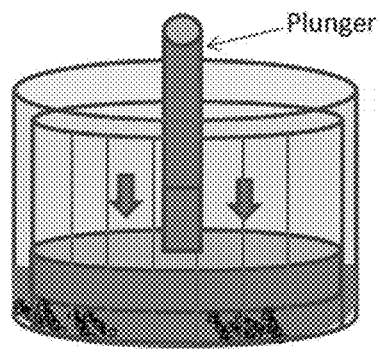
Figure 6:
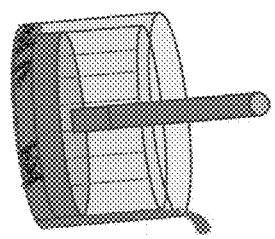
Figure 6:
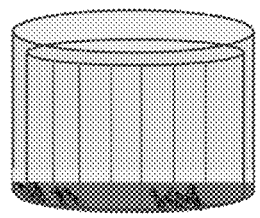

3) Mechanically applying pressure on two opposing surfaces of the mixture: This can be accomplished in a manner similar to the diagram below, which shows a plunger arrangement within a wire mesh guide set up inside a vessel containing the carbon source\template mixture. The mixture can be ultrasonically agitated prior to this step. The plunger is then inserted and pressure is applied to remove the excess liquid from the mixture. The excess liquid is drained out and the plunger removed. The remaining mixture is then extracted from the vessel and loaded into an oven to heat treat and polymerize the carbon source (Step 2). Other arrangements similar to the one shown in FIG. 6 to apply pressure to the mixture and remove the excess furfuryl alcohol may also be used.

Following polymerization, the resulting nano-porous carbon powder is processed to create electrodes using methods known to those skilled in the art, for example, by slurry-coating Al substrates with activated-carbon/water/additive mixtures, followed by drying and calendaring to fabricate uniform sheets of activated carbon electrodes. Additives include, for example, carbon black and Teflon.

Example 5 "Hard" Template Production of Carbon Powder Sources Other than Furfuryl Alcohol Step I.

The carbon source (ketones, aldehydes and furfuryl derivatives like acetylfuran, etc.) is thoroughly mixed with the polymerizing catalyst (silane, $TiCl_4$ or derivatives of both). This can be achieved by stirring the mixture at room temperature for up to 3 hours. The alumina or $Al(OH)_3$ powder is then added to this mixture and the slurry is again mixed thoroughly using one or more of the techniques described above (for the furfuryl alcohol case). In this case, it is not necessary to remove any excess liquid.

Step II.

Polymerize carbon source (Class 1) under nitrogen or air by heat-treating at 200° C. (+/−50° C.), resulting in a solid polymerized carbon precursor/$Al_2O_3$ or solid polymerized carbon precursor/$Al(OH)_3$ combination. No other polymerization catalysts are required to achieve this. The acidic nature of the template itself acted as a catalyst for the polymerization reaction. For Class 2 starting materials, additional catalysts were added to the starting materials and thoroughly mixed. Heat treatment for these starting materials is in the range of 40° C. to 120° C., depending on the starting materials (e.g. acetylfuran boils at 67° C., so temperatures need to be maintained below this point). The presence of the silane (or other catalysts) also results in an internal "soft" template of siloxane (Si—O) or Ti—O molecules embedded in the polymerized solid.

Step III.

This step is conducted under an inert atmosphere (typically nitrogen). Heat-treating, in the range of 400° C. to 700°

C., converts the polymerized compound into carbon and drives out any remaining un-polymerized volatile materials. For example, heat-treating for 1 hour at 600° C. is adequate for this step.

Step IV.

Following Step III, the material is pulverized mechanically into a coarse powder (individual pieces ~1 mm). The resulting material (carbon/alumina or carbon/Al(OH)$_3$ mixture) is then etched to remove the Al$_2$O$_3$ or Al(OH)$_3$ template. This step also etches out the soft template of siloxane (or Ti—O). The resulting material is a nano-porous carbon powder. Etching is performed with NaOH, HCl, or HF with concentrations ranging from 0.5 to 3M. Etching is carried out in the temperature range of 20-100° C. and is followed by washing thoroughly with distilled water in the same temperature range to remove the etchants. The whole process, etching and washing, is then repeated several times to ensure removal of all template materials accessible to the etchants. If powder particles of alumina (or Al(OH)$_3$) remain embedded in the carbon without access to the etchants, these particles can help with the final electrode processing by enhancing binding efficiency to the current collector (typically an alumina coated aluminum sheet).

Step V.

Following the etching process, the nano-porous carbon structure is air dried at temperatures in the range of 25-150° C. The material is activated by heat-treating in a controlled atmosphere furnace in two stages. First, the carbon is heated up to temperatures of 1000° C.+/−300° C. under nitrogen, helium or argon. Once the necessary temperature is reached, the activation process involves exposing the carbon to steam, NH$_3$, or CO$_2$ for up to 120 minutes. Cooling is performed under inert atmosphere.

Step VI.

The resulting activated carbon is now in powder form, but with a wide distribution of particle sizes. It needs to be jet-milled to get a uniform particle distribution, with a maximum particle size ~5 micron. Jet milling needs to be performed in an environment that does not add contaminants into the powder. Ideally, this is achieved by using nitrogen or steam.

Step VII.

Finally, the activated carbon powder with embedded pores is ready for processing into electrode sheets. Conventional powder processing (either wet/slurry or dry) by applying the powder with additives and binders (e.g. Teflon®) onto alumina substrates, followed by rolling/compacting into sheets. The sheets are then rolled with spacers between them; cut to size, packed into cans and filled with electrolyte to construct the EDLC devices.

Example 6: Use of "Hard" Template for Direct Production of Electrodes

Step I:

This step is the same as described above in Step I of Example 5.

Figure 9:
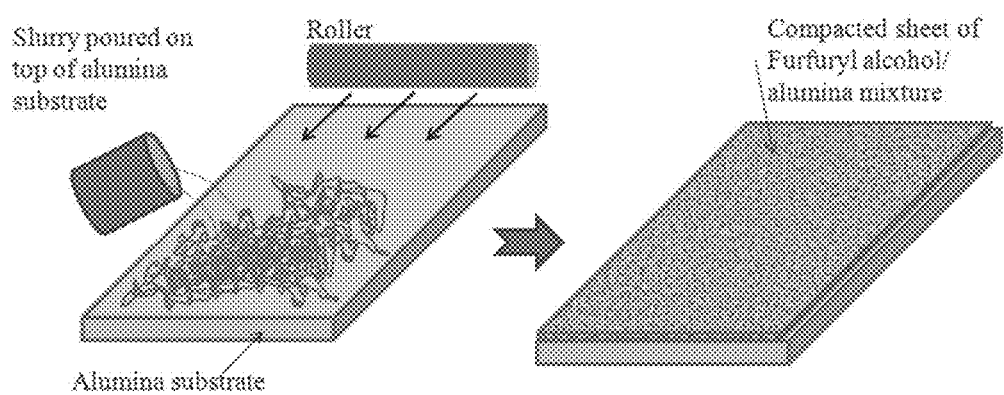
FIG. 9 shows a schematic of furfuryl alcohol/powder (alumina/$Al(OH)_3$) being applied to a substrate prior to rolling and compacting into a sheet.
Figure 10:
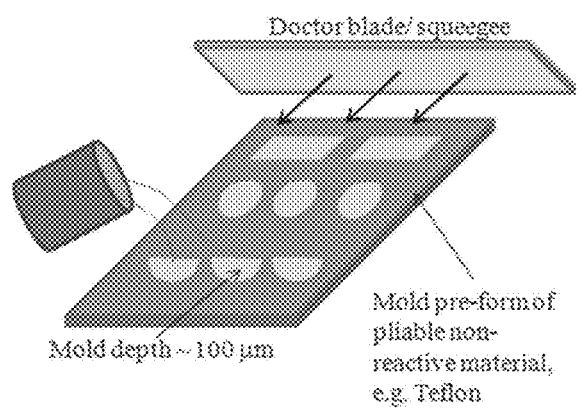
FIG. 10 shows a schematic of carbon source/powder (alumina/$Al(OH)_3$) being applied to mold on the substrate prior to applying a doctor blade or squeegee to clean up excess (A) and rolling and compacting into different shapes (B).
Figure 10:
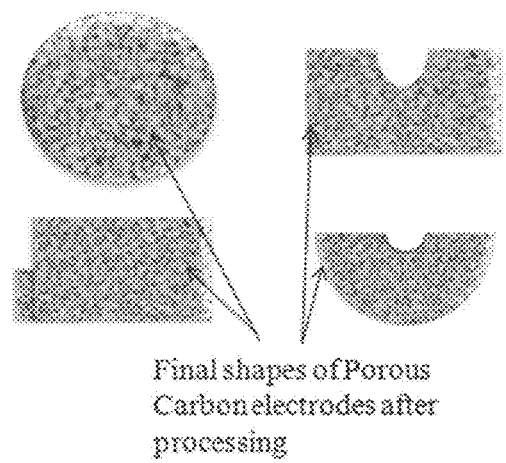

Step II:

Compaction of the mixture is achieved via rolling the slurry (mixture) on a suitable substrate surface, either directly onto an inert compatible substrate (like alumina), or into a mold made from a compliant material. The substrate is typically a sheet of alumina which provides a rigid supportive backing and can be processed later at high temperatures. A typical configuration is shown in FIG. 9, although any similar configuration that allows compaction of the mixture slurry onto a suitable substrate finds use in this step. Heat treatment follows to polymerize the carbon source into a hard solid with an external network of connected nano-particles (and, if existent, an internal template of siloxane or Ti—O molecules). Other suitable configurations include adding a Teflon backing to the alumina substrate to provide mechanical support during the compaction operation and that could also include applying direct pressure on the slurry with a plunger-type arrangement while optionally vibrating the plunger to achieve better compaction. The thickness of the slurry coating on the substrate is ~500 microns. This ensures that after all the further processing steps, the final EDLC electrode thickness ends up to be ~100 microns. In all these cases, the substrate material used must be compatible with the electrolytes used in the final EDLC configuration. Alternatively, the slurry can also be loaded into a mold as depicted in FIG. 10.

Step III:

Once mixing and compaction is achieved, the carbon source can be polymerized by heating the combination between 40° C. and to 200° C. When Class 2 sources are used, room temperature is also an option, although the time required for polymerization is longer. Heating times will be determined by actual temperatures. A typical duration for furfuryl alcohol polymerization at 200° C. is 1 hr.

Step IV:

This step is conducted under an inert atmosphere (typically nitrogen). Heat-treating, typically at 600° C. (but can be in the range of 400° C. to 700° C.), converts the polymerized compound into carbon and drives out any remaining un-polymerized volatile materials.

Step V:

The resulting carbon/alumina or carbon/Al(OH)$_3$ preforms are etched to remove the templates, resulting in a network of pores in the carbon. Etching is done with NaOH, HCl, or HF with concentrations ranging from 0.5 to 3 M to remove the templates. Etching is carried out in the temperature range of 20-100° C. and is followed by washing thoroughly with distilled water in the same temperature range, to remove the etchants. The whole process, etching and washing, is then repeated several times to ensure removal of all template materials and etching reagents. In the case of rolled sheets of the slurry on a substrate, the backs of the substrates are covered to protect them from the etchant. The substrate material is then an integral part of the electrode construction.

Step VI:

Following the etching process, the nano-porous carbon electrode structure is air dried at temperatures in the range of 25-150° C. The material is then optionally activated by heat-treating in a controlled atmosphere furnace in two stages. First, the carbon is heated up to temperatures of 1100° C.+/−100° C. under nitrogen or argon. Once the necessary temperature is reached, the activation process involves exposing the carbon to steam, NH$_3$, or CO$_2$ for up to 120 minutes. Cooling is performed under inert atmosphere. The resulting nano-porous carbon electrodes are ready for use in EDLC devices.

Example 7: Use of "Hard" Template for Production of Monolithic Electrodes

Step I.

This step involves the electrochemical etching of aluminum to create a porous alumina structure in the shape of the final electrode. Thus, different shapes like rounds, semicircles, rectangles, etc., can be used as starting materials.

Thicknesses are typically around 100-200 microns, and pore sizes achieved in the alumina after electrochemically etching are between 1 and 20 nm.

Step II.

The porous alumina template is now "loaded" with carbon sources such as furfuryl alcohol. This is achieved by immersing the electrode pre-forms into a bath of furfuryl alcohol and stirring or agitating (ultrasonically or otherwise).

Step III.

Once the electrode pre-forms are filled with a carbon source such as furfuryl alcohol, they are heat treated at temperatures up to 200° C. (+/−50° C.) to polymerize the carbon source for 30-180 minutes.

Step IV.

This step is conducted under an inert atmosphere (typically nitrogen). Heat treating, typically at 600° C. (but can be in the range of 400° C. to 700° C.), converts the polymerized furfuryl alcohol into carbon and drives out any remaining un-polymerized volatile materials.

Step V.

The resulting carbon/alumina pre-forms are etched to remove the $Al_2O_3$ template resulting in a network of pores in the carbon. The alumina/polymer solid is treated with NaOH, HCl, or HF with concentration ranging from 0.5 to 3 M to remove the alumina template. Etching is carried out in the temperature range of 20-100° C. and is followed by washing thoroughly with distilled water in the same temperature range to remove the reagents. The whole process, etching and washing, is then repeated several times to ensure removal of all alumina and etching reagents.

Step VI.

Following the etching process, the nano-porous carbon electrode structure is dried under vacuum at temperatures in the range of 25-150° C. The material is activated by heat-treating in a controlled atmosphere furnace in two stages. First, the carbon is heated up to temperatures of 1000° C.+/−300° C. under nitrogen, helium or argon. Once the necessary temperature is reached, the activation process involves exposing the carbon to steam, $NH_3$, or $CO_2$ for up to 120 minutes. Cooling is performed under inert atmosphere. The resulting nano-porous carbon electrodes (in final shape) are ready for use in EDLCs.

Example 8: Use of "Hard" Template for Production of Monolithic Electrodes

Steps I & IA.

For the slower reactions, the ketone, aldehyde or acetylfuran is thoroughly mixed with a predetermined amount of polymerizing catalyst like dichlorodimethylsilane and the mixture is stirred at room temperature for approximately 30 minutes. In the case of furfuryl alcohol, the alcohol is first mixed with acetone at room temperature and then the polymerizing catalyst (e.g. dichlorodimethylsilane) is added at reduced temperatures. Other slower polymerizing carbon sources can also be added to furfuryl alcohol. This is required to prevent the instantaneous polymerization reaction at room temperature that furfuryl alcohol undergoes in the presence of a catalyst like silane or $TiCl_4$ (or their derivatives). Dry ice may be used to cool down the beakers in which the furfuryl alcohol/acetone combination is mixed with dichlorodimethylsilane.

Step II.

The mixture is now poured into molds with the final shapes of the electrodes. The mold materials can be glass or similar non-reactive materials and the depth of the molds is ~200 microns. Shapes can be rounds, semicircles, rectangles, etc. For the furfuryl alcohol mixture, the molds are maintained at low temperatures (e.g. cooled by dry ice) during the poring operation. For the other starting materials, the mold can be maintained at room temperature.

Step III.

Polymerization of the furfuryl alcohol/silane mixture is performed by warming the molds up to room temperature in air. The other reactions require elevated temperatures to accelerate the polymerization. At room temperature, these combinations polymerize over several days, so elevated temperatures up to 120° C. will accelerate these, depending on the starting materials. For example, acetylfuran boils at 67° C., so heating to accelerate the polymerization must be below this temperature.

Step IV.

This step is conducted under an inert atmosphere (nitrogen, argon or helium). Heat-treating, typically at 600° C. (but can be in the range of 400° C. to 700° C.), converts the polymerized materials into carbon and drives out any remaining un-polymerized volatile materials.

Step V.

Etching the resulting carbon/siloxane pre-forms to remove the internal siloxane template results in a network of pores in the carbon. The solid is then treated with NaOH, HCl, or HF with concentration ranging from 0.5 to 3 M. Etching is carried out in the temperature range of 20-100° C. and is followed by washing thoroughly with distilled water in the same temperature range to remove the reagents. The whole process, etching and washing, is then repeated several times to ensure removal of all the siloxane and etching reagents.

Step VI.

Following the etching process, the nano-porous carbon electrode structure is air dried at temperatures in the range of 25-150° C. The material is activated by heat-treating in a controlled atmosphere furnace in two stages. First, the carbon is heated up to temperatures of 1100° C.+/−100° C. under nitrogen or argon. Once the necessary temperature is reached, the activation process involves exposing the carbon to steam, $NH_3$, or $CO_2$ for up to 120 minutes. Cooling is performed under inert atmosphere. The resulting nano-porous carbon electrodes, in final shape, are ready for use in EDLC devices.

Example 9: "Soft" Template for Tailor-Made Electrodes

Figure 17:
FIG. 17 depicts an example of a round disk-shaped solid carbon formed by polymerizing furfuryl Alcohol with dichlorodimethylsilane. The disk is ready for subsequent processing by etching and activation.

One pellet (approx. 0.1 g) of NaOH was added to furfuryl alcohol (50 ml) in a 500-ml jar containing a Teflon-coated stir bar and the mixture was stirred for 5 minutes on a magnetic stir plate. Acetone (50 ml) was added and the mixture stirred for another 5 minutes. Next, 12 ml of dimethyldichlorosilane was added slowly, drop by drop, with stirring at room temperature. A portion of the mixture was then poured into a smaller jar 1.5 inches in diameter such that there was about ¼ inch of liquid in the jar. This jar was allowed to stand overnight, resulting in a disk of solid carbon as shown in FIG. 17.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of producing a nano-porous carbon, comprising:
   a) mixing a liquid compound containing a furfuryl group with an aluminum-based solid polymerization catalyst powder to form a mixture;
   b) heating the mixture until a polymerized solid/catalyst composite forms;
   c) heating the polymerized solid/catalyst composite under inert atmosphere to form a catalyst/carbon matrix; and
   d) etching the catalyst/carbon matrix to remove the catalyst from the catalyst/carbon matrix to produce the nano-porous carbon.

2. The method according to claim 1, wherein the aluminum-based solid polymerization catalyst powder is at least one of an alumina ($Al_2O_3$) or aluminum hydroxide ($Al(OH)_3$).

3. The method according to claim 1, further comprising activating the nano-porous carbon.

4. The method according to claim 3, wherein the activating comprises heating under controlled atmosphere wherein the controlled atmosphere is one of a $CO_2$ or steam.

5. The method according to claim 1, wherein the b) heating step is performed between 100° C. 200° C.

6. The method according to claim 1, wherein the c) heating step is performed between 500° C. 650° C.

7. The method according to claim 1, wherein the etching step utilizes at least one of a NaOH, HCl, HF or $Cl_2$.

8. The method of claim 1, wherein the liquid compound containing a furfuryl group is at least one of a furfuryl alcohol, furfural, 5-methyl furfuryl or 5-hydroxymethyl furfuryl.

9. A method of fabricating a nano-porous carbon electrode, comprising:
   a) diluting a furfuryl group containing liquid compound with a liquid carbonyl-containing carbon source to form a solution, wherein the liquid carbonyl-containing carbon source is at least one of an acetone, ionone, benzophenone or acetylacetone;
   b) mixing a polymerization catalyst, to the solution to make a mixture;
   c) pouring the mixture into a mold;
   d) heating the mixture in the mold to form a solid polymer/catalyst composite;
   e) unmolding the solid polymer/catalyst composite;
   f) heating the solid polymer/catalyst composite to form a carbon/catalyst composite;
   g) etching the carbon/catalyst composite to remove the catalyst from the carbon/catalyst composite to produce the nano-porous carbon; and
   h) activating the nano-porous carbon, wherein the activating comprises heating under a controlled atmosphere wherein the controlled atmosphere is one of a $CO_2$ or steam.

10. The method of claim 9, wherein the furfuryl group containing liquid compound is at least one of a furfuryl alcohol, furfural, 5-methyl furfuryl or 5-hydroxymethyl furfuryl.

11. The method of claim 9, wherein the polymerization catalyst is at least one of a titanium butoxide alumina ($Al_2O_3$) or aluminum hydroxide ($Al(OH)_3$).

12. The method of claim 9, wherein the f) heating step is performed at a controlled temperature between 550° C.-650° C.

13. The method of claim 9, wherein the etching step utilizes at least one of a NaOH, HCl, HF or $Cl_2$.

14. The method of claim 9, wherein the d) heating step is performed between 40° C.-200° C.

* * * * *